United States Patent
Karabinis et al.

(10) Patent No.: US 6,549,788 B1
(45) Date of Patent: Apr. 15, 2003

(54) COMBINATION CELLULAR/SATELLITE WIRELESS COMMUNICATION DEVICES

(75) Inventors: Peter Karabinis, Cary, NC (US); Gregory A. O'Neill, Jr., Apex, NC (US); Yawei Ma, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/481,793

(22) Filed: Jan. 12, 2000

(51) Int. Cl.[7] .................................................. H04B 1/38
(52) U.S. Cl. ........................ 455/550; 455/575; 455/90; 343/702
(58) Field of Search .............................. 453/550, 13.3, 453/11.1, 90, 348, 83, 78, 347, 344, 121, 268, 129, 575; 343/702, 703, 727, 876, 882, 898, 908

(56) References Cited

U.S. PATENT DOCUMENTS

| | | | | |
|---|---|---|---|---|
| 4,220,955 A | * | 9/1980 | Frye ............................ 343/703 |
| 5,365,027 A | * | 11/1994 | Marvet et al. ............. 200/16 D |
| 5,490,284 A | | 2/1996 | Itoh et al. .................... 455/11.1 |
| 5,535,430 A | | 7/1996 | Aoki et al. ................. 455/54.1 |
| 5,551,080 A | * | 8/1996 | Chambers et al. .......... 455/348 |
| 5,628,049 A | * | 5/1997 | Suemitsu .................... 455/11.1 |
| 5,739,790 A | * | 4/1998 | Green, Jr. .................... 343/702 |
| 5,764,191 A | * | 6/1998 | Tsuda .......................... 343/702 |
| 5,854,970 A | | 12/1998 | Kivela .......................... 455/90 |
| 6,094,178 A | * | 7/2000 | Sanford ....................... 343/895 |
| 6,198,431 B1 | * | 3/2001 | Gibson ................... 342/357.07 |
| 6,259,897 B1 | * | 7/2001 | Kim ............................... 455/90 |
| 6,320,549 B1 | * | 11/2001 | Nybeck et al. ............. 343/727 |

FOREIGN PATENT DOCUMENTS

DE    19800937 A1 * 2/1999  ............ H01Q/1/22

* cited by examiner

*Primary Examiner*—Thanh Cong Le
*Assistant Examiner*—C. Chow
(74) *Attorney, Agent, or Firm*—Wood, Phillips, VanSanten, Clark & Mortimer

(57) ABSTRACT

A mobile phone including a handset having a transceiver adapted for selective communication in cellular and satellite modes. The handset includes a cellular antenna adapted to receive cellular wavelength signals, a connector for a satellite antenna, and a switch adapted to selectively connect either the cellular antenna or the connector to the transceiver. The satellite antenna is adapted for selective connection to the connector of the mobile phone handset, the satellite antenna being adapted to receive satellite wavelength signals. The satellite antenna includes a cavity in a first portion adapted to receive and frictionally secure to the cellular antenna, and a plunger is adapted to engage the switch to disconnect the cellular antenna from, and connect the satellite antenna to, the transceiver when the satellite antenna is secured to the handset connector.

24 Claims, 4 Drawing Sheets

FIG. 5
FIG. 6
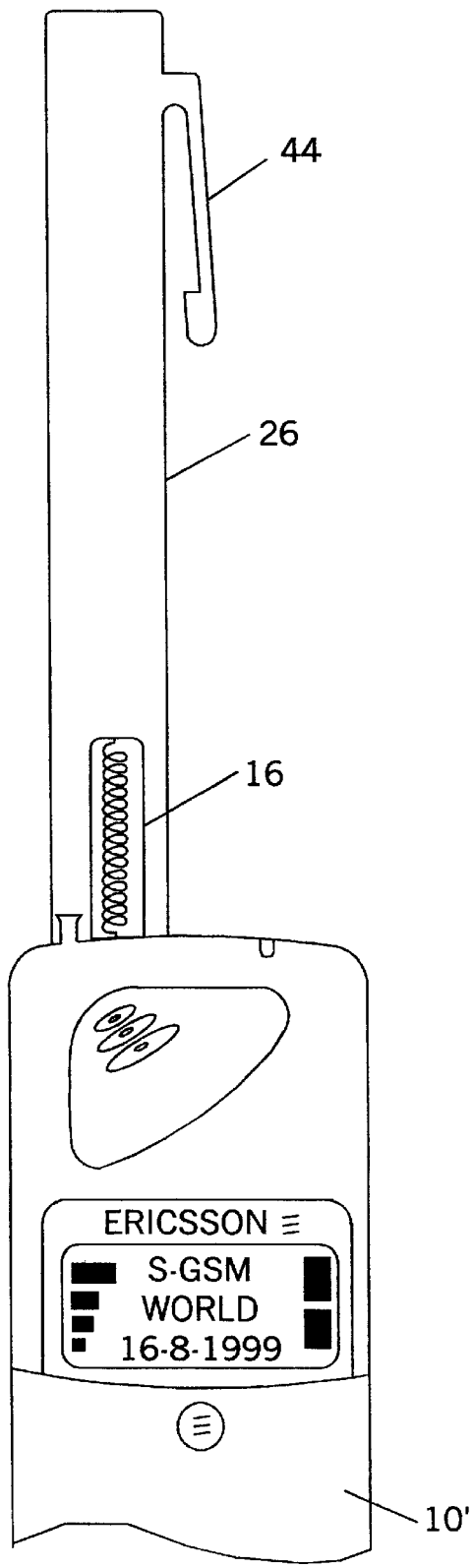
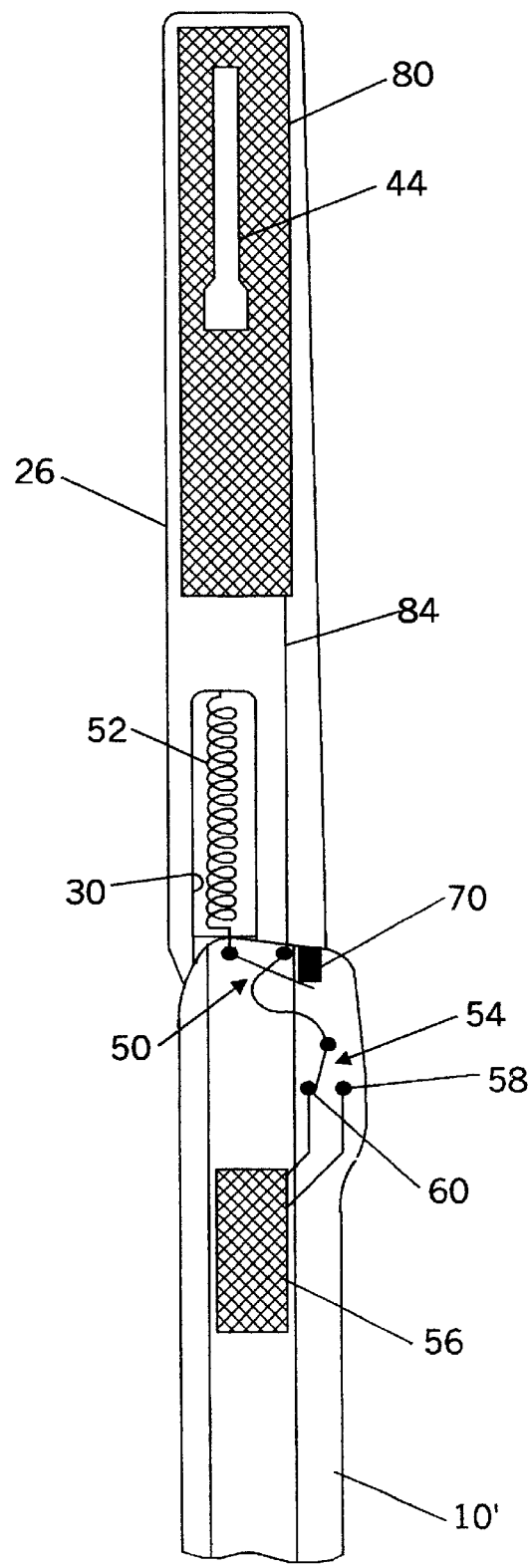

COMBINATION CELLULAR/SATELLITE WIRELESS COMMUNICATION DEVICES

BACKGROUND OF THE INVENTION

The present invention is directed toward wireless communication devices, and more particularly toward wireless communication devices intended to transmit and receive signals in different modes operating in different bandwidths, such as cellular and satellite communications.

Wireless communication devices such as cellular and satellite telephones communicate via radio signals. In order to properly receive and transmit signals in a particular system of communication (e.g., cellular or satellite), it is necessary to have an appropriate antenna which is tuned to work with the frequencies/wavelengths in the bandwidth of the system with which the device is designed to be used. With devices intended to be used with satellite systems, the size of the antenna required on the portable handsets in the system can be fairly large (e.g., Cuban-cigar like). Such an antenna can be particularly detrimental for portable handsets given its size and weight. Wireless communication device users are more and more coming to expect to be able to unobtrusively slip the handsets into their pockets (as is today common for cellular telephones), and the inability to do so with satellite communication devices which require such large antennas has, along with other factors, significantly obstructed the market acceptance of such devices. Dual mode devices, which may be operated with both cellular and satellite systems, face similar problems, as they also require one or more antennas tuned to operate properly with both systems, including a large antenna for receiving signals in the satellite system bandwidth.

The present invention is directed toward overcoming one or more of the problems set forth above.

SUMMARY OF THE INVENTION

In one aspect of the invention, a mobile communication device is provided, including a portable handset including a transceiver adapted for selective communication in first and second wireless modes. The handset includes a first antenna adapted to receive and transmit wireless signals having a wavelength in a first range, a connector, and a switch adapted to selectively connect either the first antenna or the connector to the transceiver. A second antenna is also provided and adapted for selective connection to the connector of the portable handset. The second antenna is adapted to receive and transmit signals having a wavelength in a second range, the second range being wavelengths different than the wavelengths in the first range.

In one form of this aspect of the invention, the second antenna includes a pocket clip whereby the mobile communication device user may securely carry the second antenna in a user's pocket when the second antenna is not connected to the portable handset connector.

In another form, the connector includes electrical contacts on the portable handset adapted to connect the second antenna to the transceiver when the second antenna is connected to the handset connector.

In still another form, a cavity is provided in the second antenna and adapted to receive the first antenna, the first antenna being frictionally secured to the second antenna when received in the second antenna cavity. In a related form, the second antenna cavity has at least a portion smaller than the first antenna, wherein at least one of the second antenna cavity and the first antenna is elastically deformable.

In yet another preferred form, the first antenna is tuned to receive and transmit signals in the first range and is further adapted to receive and transmit a broad band of signals including signals in the second range.

In other preferred forms, a plunger is adapted to engage the switch to disconnect the first antenna from the transceiver and connect the second antenna to the transceiver when the second antenna is secured to the portable handset connector, and the connector comprises axially spaced joining members. A preferred form is also used with cellular signals having wavelengths in the first range and satellite signals having wavelengths in the second range, with a mode switch provided for selectively switching the transceiver between cellular and satellite modes.

In still another preferred form, the second antenna includes first and second portions, with the first portion adapted for selective connection to the connector of the portable handset, the first portion including a member adapted to connect to the switch when the second antenna is connected to the connector, and the second portion including antenna radiating elements. A pivotable connection is provided between the first and second portions, with the pivotable connection adapted to allow the second portion to be positionally adjusted relative to the first portion. In further preferred forms, a coaxial cable extends from the first portion member to the antenna radiating elements, the coaxial cable connecting the antenna radiating elements to the switch when the second antenna is connected to the connector, and the first and second portions are substantially longitudinal with the pivotal connection connecting the first and second portions substantially end to end whereby the positional adjustment is pivoting of one second antenna portion relative to the other second antenna portion about an axis substantially normal to the longitudinal direction of both the second antenna first and second portions.

In another aspect of the present invention, a mobile phone is provided including a handset including a transceiver adapted for selective communication in cellular and satellite modes. The handset includes a cellular antenna adapted to receive and transmit cellular wavelength signals, a connector for a satellite antenna, and a switch adapted to selectively connect either the cellular antenna or the connector to the transceiver. A satellite antenna is also provided and adapted for selective connection to the connector of the mobile phone handset, the satellite antenna adapted to receive and transmit satellite wavelength signals.

Preferred forms of this aspect of the invention include the above described preferred forms of the first described aspect of the invention as used in cellular and satellite systems.

Another preferred form of this aspect of the present invention is that the cellular antenna is further adapted to receive satellite page signals.

In yet another aspect of the present invention, a method of operating a mobile communication device is provided, including the steps of (1) receiving and transmitting cellular telephone signals and control satellite signals with a first antenna connected to a transceiver of the mobile communication device, (2) selectively connecting a second antenna to the transceiver when choosing to receive and transmit traffic channel satellite signals, the connecting step automatically disconnecting the first antenna from the transceiver, whereby the first antenna is tuned to cellular and satellite telephone signal wavelengths and the second antenna is tuned to satellite signal wavelengths.

BRIEF DESCRIPTION OF THE DRAWINGS

FIG. 5 is a plan view of the handset of FIG. 3 illustrating the satellite mode antenna connected to the handset; and FIG. 6 is a side view similar to FIG. 3 with the satellite mode antenna attached to the handset.

DETAILED DESCRIPTION OF THE INVENTION

Figure 1:
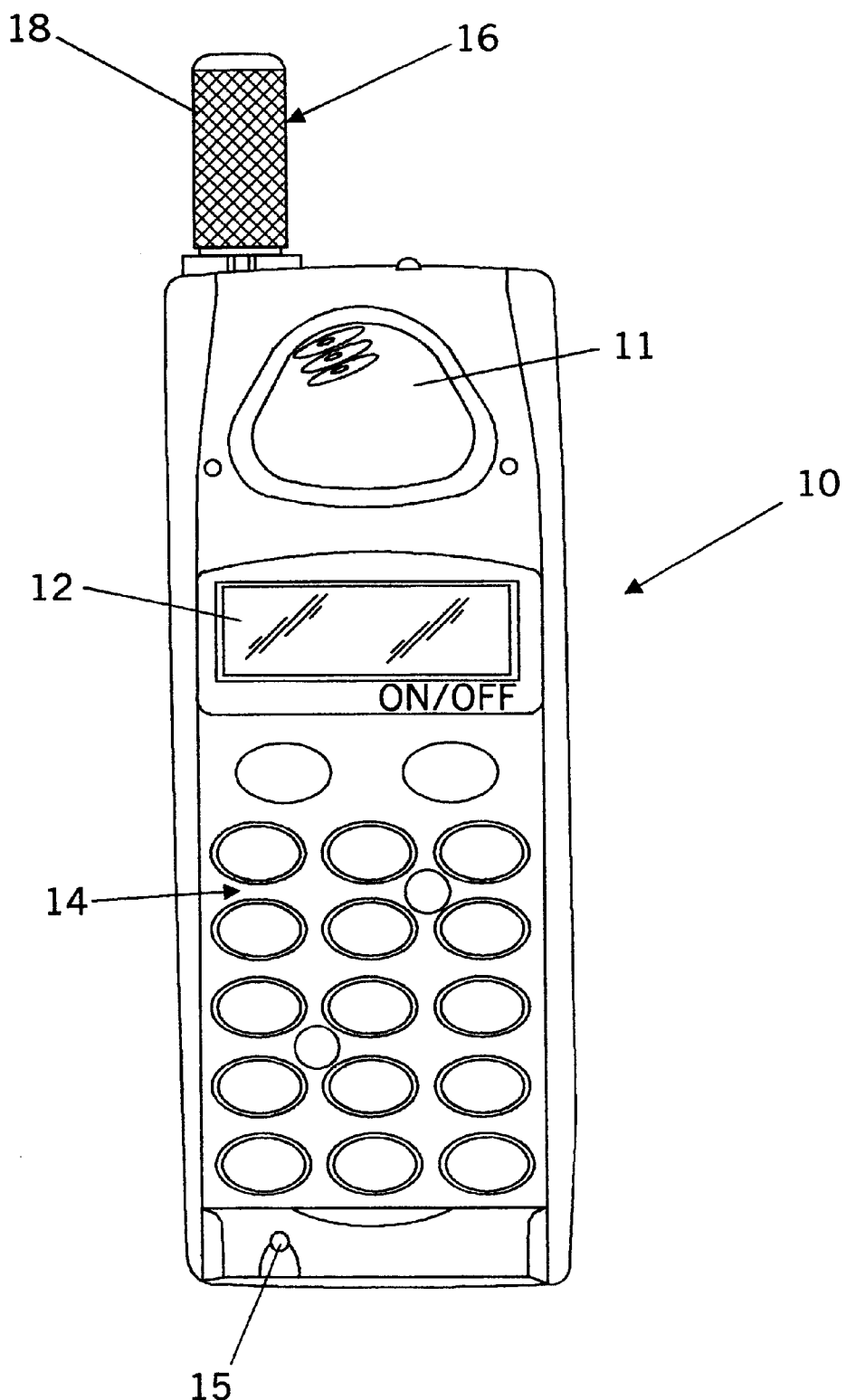
FIG. 1 is a plan view of a cellular telephone handset embodying the present invention in a cellular mode.
Figure 2:
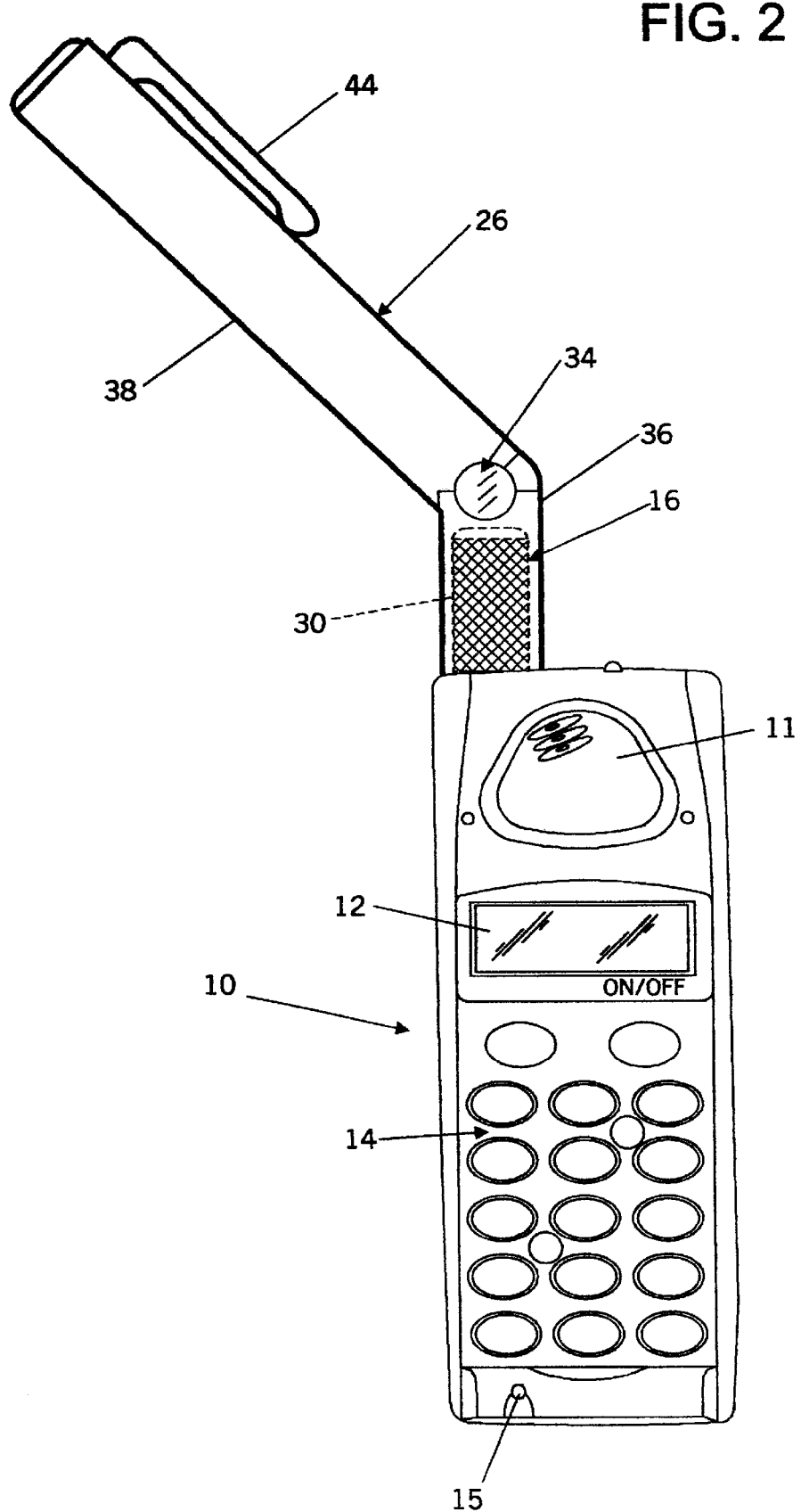
FIG. 2 is a plan view of the cellular telephone handset of FIG. 1 in a satellite mode with a satellite mode antenna attached.

FIGS. 1–2 generally illustrate a wireless portable handset 10 embodying the present invention. As illustrated, the handset 10 includes a speaker 11, a display 12, a touch pad input 14, a microphone 15, and a cellular mode antenna 16. Once the present invention is fully understood, it will be recognized by those skilled in the art that the handset 10 could be provided with a wide variety of features and functions beyond those described herein, which description is focused on the features relating particularly to the invention.

The cellular mode antenna 16 is tuned to transceive radio signals in the cellular band (i.e., signals having frequencies/wavelengths in the bandwidth allocated to the cellular telephone system with which the handset 10 is expected to be used).

As will be more fully understood hereafter, the handset 10 of the present invention is intended to be used with two different types of systems, specifically a terrestrial cellular system and a satellite system. These systems typically operate over different signal bandwidths (e.g., on the order of 900 megahertz for terrestrial cellular systems and 1.6 gigahertz for satellite systems), and thus the cellular mode antenna 16 will be tuned for the cellular bandwidth but not for the satellite bandwidth.

However, it should be understood that in the preferred mode as used with mobile satellite systems equipped with high penetration paging modes, such as ACeS (Asian Cellular Satellite system), the cellular mode antenna 16 can be broadbanded so that it will also function adequately as a paging antenna for satellite mode. In such systems, the satellite system sends paging messages (indicating, e.g., that there is an incoming call to the handset over the satellite system) at significantly greater power than normal communication signals. Such a power increase enables the satellite paging signal to be adequately received even though the cellular antenna 16 is less than optimal for signals in the satellite bandwidth, and the transceiver in the handset 10 will be able to receive the page when the transceiver is operating in satellite mode (i.e., is looking for signals in the satellite bandwidth).

While the invention is described herein with particular reference to dual modes of operation with both cellular and satellite systems (e.g., terrestrial GSM and ACeS), it should be understood that the invention in broad scope may be used with any combination of systems using different bandwidths where different antennas are required for the different bandwidths, and is particularly advantageous in those circumstances where one of the different antennas adds weight or bulk to the handset 10.

The outer surface of the radome 18 covering the cellular mode antenna 16 defines a particular shape, such as a cylinder, and a satellite mode antenna 26 is provided with a suitably matching cavity 30 (see FIG. 2) so that the satellite mode antenna 26 may be suitably secured onto the cellular mode antenna 16 with the cellular mode antenna 16 acting as a mechanical support for the satellite mode antenna 26 (such connection is also further described below particularly in FIG. 4). Specifically, in one preferred embodiment, the cavity 30 and radome 18 are matched so that there is a frictional connection which will secure the two together (e.g., with the cavity 30 deformable but slightly smaller than the radome 18), such as the cap secured onto a magicmarker. However, it should be understood that it would be within the scope of the present invention to provide other means of connection including, for example, a structure in which one or both of the components (antenna 16 and cavity 30) are elastically deformable whereby a detent or similar structure will deform when the two are being connected and then snap into place when aligned with a matching recess in the other component.

In a preferred form as illustrated in FIG. 2, the satellite mode antenna 26 includes a suitable pivotal connection 34 allowing the two generally longitudinally extending end portions 36, 38 of the satellite mode antenna 26 to pivot relative to one another about an axis generally perpendicular to the longitudinal direction of the end portions 36, 38. In the preferred form, the pivotal connection 34 has no exposed openings or the like which might pinch a user or catch the user's hair.

The satellite mode antenna 26 includes a pocket clip 44 whereby the handset user may securely carry the satellite mode antenna in his or her shirt pocket like a pen or standard magic marker when the satellite mode antenna 26 is not in use (as shown in FIG. 1). As illustrated in FIG. 2, the clip 44 is on the radome end portion 38, although it should be understood that the clip 44 could also be provided on the end portion 36 having the cavity 30.

FIGS. 3–6 illustrate further electromechanical details of a preferred embodiment of the invention described generally above with respect to FIGS. 1–2. Further, for simplicity of illustration, certain internal components are not illustrated as hidden inside the handset 10', although those skilled in the art will readily recognize the preferred location of such components inside the handset housing.

Figure 3:
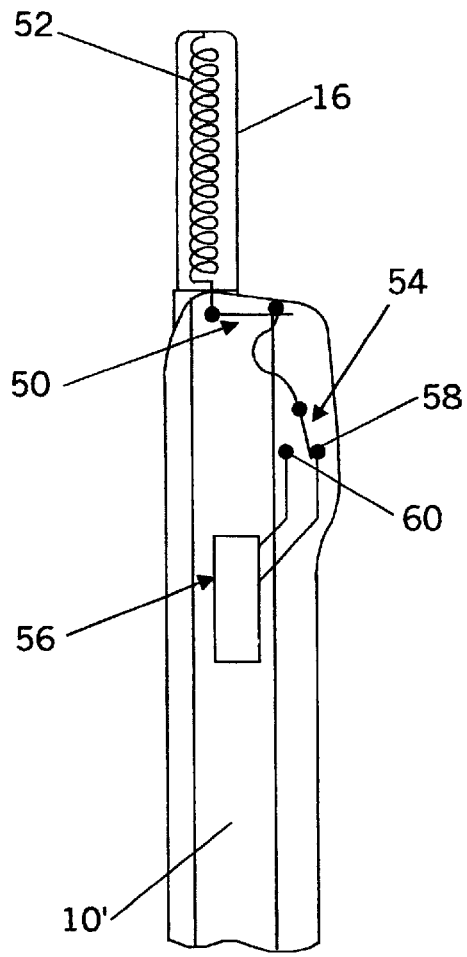
FIG. 3 is a side view of a cellular telephone handset similar to that shown in FIG. 1 and illustrating exemplary electromechanical components according to the present invention.

As illustrated in FIG. 3, the handset 10' includes a mechanical switch 50 which connects the antenna radiating elements 52 of the cellular mode antenna 16 to a mode selection switch 54. The mode selection switch 54, which may be changed by user input (e.g., through the touch pad input 14) or may be changed automatically by the handset 10' in response to the user menu settings and signal detection algorithms, switches the mode of operation of the transceiver 56 connected to the antenna 16 (or 26 as described in FIG. 5) (the transceiver 56 is described herein in only general terms; suitable transceivers and related components appropriate to transceive radio signals according to the standard of the wireless systems with which the handset is being used will be readily recognized by those skilled in the art once a full understanding of the invention is obtained, and therefore no detailed description of those elements is set forth herein).

For example, as illustrated in FIG. 3, the switch 54 is set to the cellular mode terminal 58, so that the transceiver 56 is transceiving cellular band signals from the cellular mode antenna 16. The switch 54 could be changed to the satellite mode terminal 60, in which case the transceiver 56 would transceive satellite band signals from the cellular mode antenna 16 (as previously described, though the cellular mode antenna 16 may not be optimum for signals in the satellite bandwidth, it should still adequately receive paging signals in systems in which the power of the paging signals is stepped up by the satellite).

Figure 4:
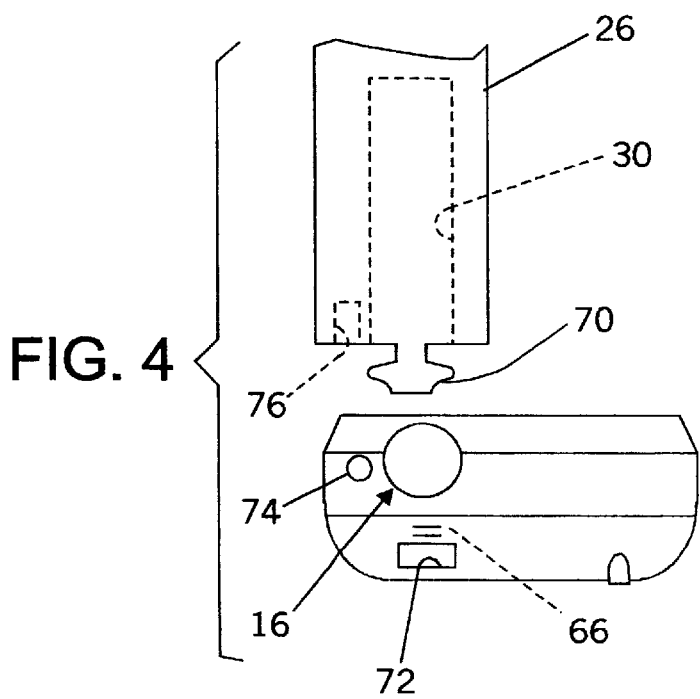
FIG. 4 is a view of the connecting ends of the handset of FIG. 3 and the associated satellite mode antenna.

FIG. 4 illustrates one preferred mechanical connection between the handset 10' and the satellite mode antenna 26. Specifically, the handset 10' includes the cellular mode antenna 16 which is received inside a cavity 30 in the satellite mode antenna 26 as previously described. An electrical connector 66 is also provided in the handset 10' and includes suitable contacts to connect with electrical contacts on the satellite mode antenna 26 as described further below. A plunger 70 projects from the bottom of the satellite mode antenna 26 and is received in a recess 72 in the handset 10' to automatically change the position of the mechanical switch 50 as is also described below. Additional mechanical components such as a pin 74 and recess 76 may also be provided to further securely connect the satellite mode antenna 26 to the handset 10' when desired and to assist in bearing stresses which might be incurred to protect the cellular mode antenna 16 and plunger 70 from damage. It should be recognized, however, that connectors between the handset 10' and the satellite mode antenna 26 which are different from those illustrated in FIG. 4 may be used within the scope of the present invention.

The satellite mode antenna 26 is illustrated as connected to the handset 10' in FIGS. 5–6. As best illustrated in FIG. 6, the satellite mode antenna 26 includes suitable antenna radiating elements 80 for the satellite system with which the handset 10' is designed to be used. In the preferred embodiment, the satellite mode antenna radiating elements 80 comprise a Quadrifilar Helix (QFH) antenna tuned to transceive radio signals in the satellite bandwidth. Design of QFH antennas is disclosed in U.S. Pat. Nos. 5,896,113 ("Quadrifilar Helix Antenna with Switching Diodes"), U.S. Pat. No. 5,909,196 ("Quadrifilar Helix Antenna with Integral Impedance-Matching") and U.S. Pat. No. 5,920,292 ("Dual Band Quadrifilar Helix Antenna with Integral Half Duplex"), the full disclosures of which are hereby incorporated by reference. However, is should be understood that still other antenna radiating element designs adequately tuned to transceive signals in the satellite (or other second system) bandwidth would be usable with the present invention. Note that with the illustrated configuration, the satellite mode antenna radiating elements 80 are located above where the user's ear would typically be located, thereby minimizing any interference potentially resulting from the mass of the user's head.

A suitable electrical connector such as coaxial cable 84 extends from the radiating elements 80 to the end of the satellite mode antenna 26 and contact the electrical connector 66 in the handset 10'. The plunger 70 engages the mechanical switch 50 so as to automatically disconnect the cellular mode antenna 16 when the satellite mode antenna 26 is attached to the handset 10' as shown in FIG. 6, so that the satellite mode antenna radiating elements 80 are connected to the mode selection switch 54 which, with the satellite mode antenna 26 attached, is connected to the satellite mode terminal 60.

Though it is desirable that the mode selection switch 54 be changeable through user input (so that either mode can be selected by the user when the cellular mode antenna 16 is connected through switch 50 as previously described), it would be within the scope of the present invention to also have the mode selection switch 54 suitably switched automatically to the satellite mode terminal 60 when the satellite mode antenna 26 is attached.

It should also be understood that both switches 50, 54 could be of a different configuration than that shown in the Figures. For example, the mode selection switch 54 could be simply programming in the processor of the handset 10' rather than the mechanical switch structure shown for simple illustration purposes in FIGS. 3 and 6. Further, the mechanical switch 50 could be any other switch (not necessarily even categorized as a mechanical switch) which will electrically couple the satellite mode antenna radiating elements 80 to the transceiver 56 and disconnect the cellular antenna radiating elements 52 from the transceiver 56, preferably automatically, when the satellite mode antenna 26 is attached to the handset 10'.

Another approach could be to do away with switch 50 and electrical contact point 66 altogether. Instead, the antenna 16 on handset 10 is appropriately dual banded to transceive both the cellular band frequencies and the satellite band frequencies. When operating in the satellite band frequencies, the satellite mode antenna 26 can be attached mechanically onto the handset antenna 16 by fitting antenna 16 into the cavity 30 of satellite mode antenna 26. The electrical energy can then be coupled to satellite antenna 26 to and from the handset antenna 16 by inductive and/or capacitive means as will be apparent to those skilled in the art. Such means of coupling electrical energy from one antenna to another is well known in the art and is used, for example, in car kits whereby the electrical energy to and from a handset antenna is coupled to and from a car antenna situated outside of the vehicle when the handset is positioned into a car kit holder inside the vehicle.

Still further, it should be appreciated that a similar suitable connection may be provided for connecting (e.g., via a coaxial cable) a car kit external antenna tuned to operate with signal frequencies in the satellite system bandwidth for satellite mode operation when the user is in a car.

It should thus now be appreciated that the handset 10 according to the present invention may be operated in one mode (cellular) without the burden of the large and heavy satellite mode antenna 26. Given that the handset 10 will most frequently operate in that one mode (cellular), the user will be able to carry the handset 10 without that size and weight burden, potentially freeing the user to conveniently carry the handset 10 in his or her pocket (by freeing the design of the handset 10 from the constraint of size required for satellite mode antennas) and thereby increasing user acceptance and market appeal for such handsets 10 and the systems with which they work.

Only when the handset 10 is intended to be used in the satellite mode to communicate with the satellite system will the satellite mode antenna 26 necessarily be attached to the handset 10. In that case, the antenna 26 can be readily and easily attached to the handset 10, substituting itself for the cellular mode antenna 16 in the connection to the transceiver 56, with operation thereafter occurring with an antenna 26 tuned for proper operation with signals in the satellite system bandwidth.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. A mobile communication device for transmitting and receiving signals in different modes, the mobile communication device comprising:
   a portable handset adapted to communicate in both first and second wireless modes;
   a transceiver contained within the portable handset adapted for selective communication in first and second wireless modes;
   a first antenna mounted on the portable handset adapted to receive wireless signals having a wavelength in a first range;
   a connector mounted on the portable handset;
   a switch contained within the portable handset adapted to selectively connect either the first antenna or the connector to the transceiver; and
   a second antenna adapted for selective connection to the connector and to receive signals having a wavelength in a second range that is different than the wavelength in the first range, wherein said second antenna is portable and includes a cavity adapted to receive said first antenna, said first antenna being frictionally secured to said second antenna when received in said second antenna cavity.

2. The mobile communication device of claim 1, wherein said second antenna includes a pocket clip whereby the mobile communication device user may securely carry said second antenna in a user's pocket when said second antenna is not connected to the portable handset connector.

3. The mobile communication device of claim 1, wherein said connector comprises electrical contacts on the portable handset adapted to connect the second antenna to the transceiver when said second antenna is connected to the handset connector.

4. The mobile communication device of claim 1, further comprising a cavity in said second antenna adapted to receive said first antenna, said first antenna being frictionally secured to said second antenna when received in said second antenna cavity.

5. The mobile communication device of claim 1, wherein at least one of said second antenna cavity and said first antenna is elastically deformable.

6. The mobile communication device of claim 1, wherein the first antenna includes means to receive signals in both the first range and the second range.

7. The mobile communication device of claim 1, further comprising a plunger adapted to engage the switch to disconnect the first antenna from the transceiver and connect the second antenna to the transceiver when the second antenna is secured to the portable handset connector.

8. The mobile communication device of claim 1, wherein said connector comprises axially spaced joining members.

9. The mobile communication device of claim 1, wherein cellular signals have wavelengths in the first range and satellite signals have wavelengths in the second range, further comprising a mode switch for selectively switching the transceiver between cellular and satellite modes.

10. The mobile communication device of claim 1, wherein said second antenna comprises:
   a first portion adapted for selective connection to the connector of the portable handset, said second antenna first portion including a member adapted to connect to the switch when said second antenna is connected to the connector;
   antenna radiating elements in a second portion of the second antenna; and
   a pivotable connection between said second antenna first portion and said second antenna second portion, said pivotable connection adapted to allow said second antenna second portion to be positionally adjusted relative to the second antenna first portion.

11. The mobile communication device of claim 10, further comprising a coaxial cable extending from the first portion member to the antenna radiating elements, said coaxial cable connecting said antenna radiating elements to the switch when said second antenna is connected to said connector.

12. The mobile communication device of claim 10, wherein said second antenna first and second portions are substantially longitudinal and said pivotal connection connects said second antenna first and second portions substantially end to end, whereby said positional adjustment is pivoting of one second antenna portion relative to the other second antenna portion about an axis substantially normal to the longitudinal direction of both the second antenna first and second portions.

13. A mobile communication device for transmitting and receiving signals in different modes, the mobile communication device comprising:
   a portable handset adapted to communicate in both cellular and satellite modes;
   a transceiver contained within the portable handset adapted for selective communication in cellular and satellite modes;
   a first antenna mounted on the portable handset adapted to receive cellular wavelength signals;
   a connector mounted on the portable handset;
   a switch contained within the portable handset adapted to selectively connect either the first antenna or the connector to the transceiver; and
   a second portable antenna adapted for selective connection to the connector and to receive satellite wavelength signals.

14. The mobile communication device of claim 13, wherein said second portable antenna includes a pocket clip whereby the mobile communication device user may securely carry said second portable antenna in a user's pocket when said second portable antenna is not connected to the mobile phone handset connector.

15. The mobile communication device of claim 13,
   wherein said connector comprises electrical contacts on the portable handset adapted to connect the second portable antenna to the transceiver when said second portable antenna is connected to the connector, and
   further comprising a cavity in said second portable antenna adapted to receive said first antenna, said first antenna being frictionally secured to said second portable antenna when received in said second portable antenna cavity.

16. The mobile communication device of claim 13, wherein the first antenna includes means to receive both cellular and satellite signals.

17. The mobile communication device of claim 13, further comprising a plunger adapted to engage the switch to disconnect the first antenna from the transceiver and connect the second portable antenna to the transceiver when the second portable antenna is secured to the portable handset connector.

18. The mobile communication device of claim 13, wherein said connector comprises axially spaced joining members.

19. The mobile communication device of claim 13, further comprising a mode switch for selectively switching the transceiver between cellular and satellite modes.

20. The mobile communication device of claim 13, wherein the second portable antenna comprises:
- a first portion adapted for selective connection to the connector of the portable handset, said second portable antenna first portion including a member adapted to connect to the switch when said second portable antenna is connected to the connector;
- antenna radiating elements in a second portion of the second portable antenna; and
- a pivotable connection between said second portable antenna first portion and said second portable antenna second portion, said pivotable connection adapted to allow said second portable antenna second portion to be positionally adjusted relative to the second portable antenna first portion.

21. The mobile communication device of claim 20, further comprising a coaxial cable extending from the first portion member to the antenna radiating elements, said coaxial cable connecting said antenna radiating elements to the switch when said second portable antenna is connected to said connector.

22. The mobile communication device of claim 20, wherein said second portable antenna first and second portions are substantially longitudinal and said pivotal connection connects said second portable antenna first and second portions substantially end to end, whereby said positional adjustment is pivoting of one second portable antenna portion relative to the other second portable antenna portion about an axis substantially normal to the longitudinal direction of both the second portable antenna first and second portions.

23. The mobile communication device of claim 13, wherein said second portable antenna is substantially longitudinal.

24. A method of operating a mobile communication device, comprising the steps of:
- receiving cellular telephone signals and control channel satellite signals with a first antenna connected to a portable handset transceiver of the mobile communication device;
- selectively connecting a second portable antenna to the portable handset transceiver when choosing to receive and transmit traffic channel satellite signals, said connecting step automatically disconnecting the first antenna from the portable handset transceiver;
- whereby said first antenna is tuned to cellular telephone signal wavelengths and said second portable antenna is tuned to satellite signal wavelengths.

* * * * *